Figure 1:
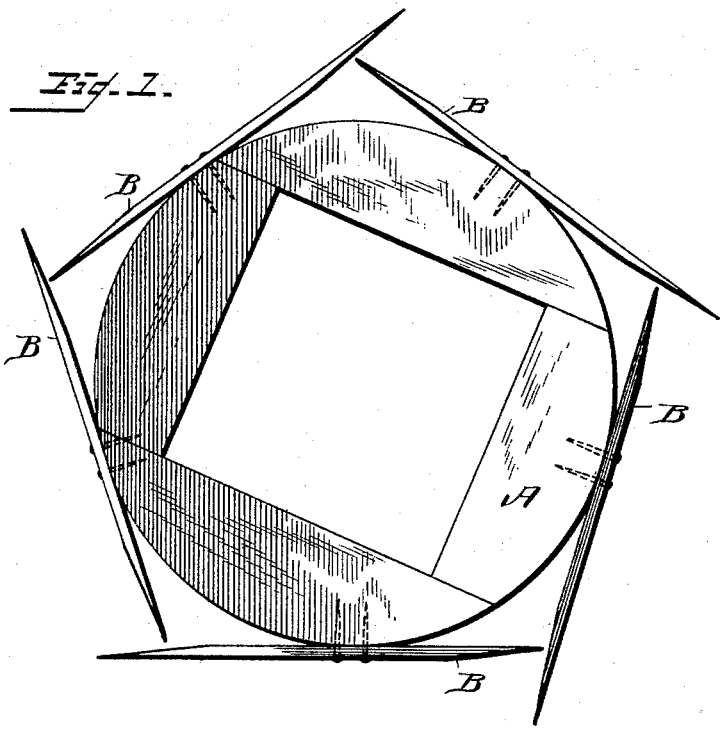

(No Model.)

R. J. PATTERSON.
FRUIT PACKING CASE.

No. 430,880. Patented June 24, 1890.

Witnesses

Inventor
Ralph J. Patterson
By his Attorney
Franklin H. Hough

THE NORRIS PETERS CO., PHOTO-LITHO., WASHINGTON, D. C.

UNITED STATES PATENT OFFICE.

RALPH J. PATTERSON, OF DOCTOR TOWN, GEORGIA.

FRUIT-PACKING CASE.

SPECIFICATION forming part of Letters Patent No. 430,880, dated June 24, 1890.

Application filed March 11, 1890. Serial No. 343,466. (No model.)

*To all whom it may concern:*

Be it known that I, RALPH J. PATTERSON, a citizen of the United States, residing at Doctor Town, in the county of Wayne and State of Georgia, have invented certain new and useful Improvements in Fruit-Packing Cases; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in shipping cases or crates; and it has for its object the production of an improved device of this character which shall be simple, cheap, and durable, and which can be readily set up, and which shall allow of the shipping of fruit without injury to the same.

Other objects and advantages of the invention will hereinafter appear, and the novel features thereof will be specifically defined by the claims.

The novelty resides in the peculiarities of construction and the combinations, arrangement, and adaption of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 2:
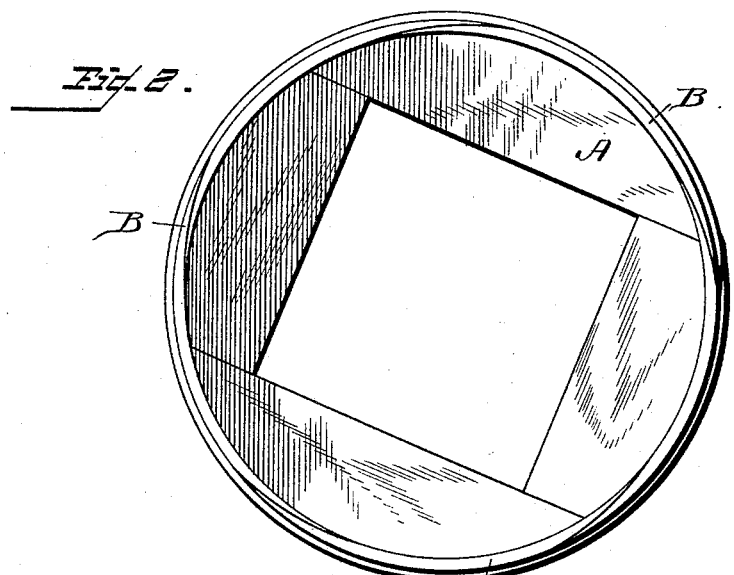

Figure 1 is a top plan of a crate or case embodying my invention, the staves being shown in the position they assume just before they are brought together and the hoop placed on. Fig. 2 is a like view with the hoop in place.

Like letters of reference indicate like parts in both figures of the drawings.

Referring now to the details of the drawings by letter, A designates a head of the crate or case, which may be of any ordinary or well-known construction, but preferably of the form shown in one of my applications for the head of even date herewith, wherein a central portion of the head is made detachable and preferably of thinner material than that of the remaining portions.

B designates the staves, which are of thin flexible material, and, as shown best in Fig. 1, are provided with oppositely-beveled vertical edges. These may be formed by inclined cuts when separating the staves or forming the same, thus effecting a saving of material. I employ, preferably, five of these staves for a case or crate, of such width as to overlap when brought together, so as to form a closed case or crate; but they may be so arranged as to leave a space between each two staves or between alternate staves, as preferred.

In practice I may secure the staves to the outer edges of the heads at substantially the center of the width of the staves, as shown in Fig. 1, by nails or staples, and then by suitable means bring the staves together so as to bring the beveled edges upon each other, as shown in Fig. 2, thus forming a smooth outer surface, and the edges, overlapping, allow of shrinkage of the staves without leaving openings through which small articles— such as peas or beans—might escape. After the staves are brought around the case, as may be readily done on account of their flexible nature, the hoop or band is driven on and secured in any suitable manner.

I may sometimes place the staves in position, as shown in Fig. 2, without securing them to the heads, and when the hoop or band is placed in position secure both hoop or band and staves by means passed through the hoop or band, through the center of the staves, and into the heads.

A crate or case thus constructed is simple, cheap, easy of manufacture, and very durable and efficient in use.

The staves or head, or both, may be perforated, if desired, to provide for ventilation.

What I claim as new is—

1. A crate or case composed of suitable heads, staves having oppositely-beveled vertical edges, hoops embracing the staves, and securing means passed through the staves substantially at their center and into the outer edges of the heads, substantially as specified.

2. A crate or case composed of suitable heads, staves having oppositely-beveled vertical edges overlapped, hoops embracing the staves, and securing means passing through the hoops and substantially centrally through the staves and into the outer edges of the heads, substantially as specified.

In testimony whereof I affix my signature in presence of two witnesses.

RALPH J. PATTERSON.

Witnesses:
J. S. LEE,
H. W. WHALEY.